US006983957B2

(12) United States Patent
Bettinger

(10) Patent No.: US 6,983,957 B2
(45) Date of Patent: Jan. 10, 2006

(54) COMPRESSED SEAL FOR A MOVABLE JOINT

(76) Inventor: David S. Bettinger, 8030 Coventry, Grosse Ile, MI (US) 48138

( * ) Notice: Subject to any disclaimer, the term of this patent is extended or adjusted under 35 U.S.C. 154(b) by 23 days.

(21) Appl. No.: 10/065,787

(22) Filed: Nov. 19, 2002

(65) Prior Publication Data

US 2004/0094955 A1    May 20, 2004

(51) Int. Cl.
*F16L 27/00*    (2006.01)
(52) U.S. Cl. .................... 285/302; 285/145.1; 285/298; 285/420
(58) Field of Classification Search ................ 285/302, 285/145.1, 145.4, 32, 420, 364, 365, 232, 285/236, 298, 337
See application file for complete search history.

(56) References Cited

U.S. PATENT DOCUMENTS

| 2,982,311 | A | * | 5/1961 | Haskell ........................ 138/100 |
| 3,652,108 | A | * | 3/1972 | Coats ......................... 285/145.3 |
| 3,741,238 | A | * | 6/1973 | Lacey ......................... 137/899.1 |
| 4,693,502 | A | * | 9/1987 | Oetiker ...................... 285/334.5 |
| 5,129,685 | A | * | 7/1992 | Engel ........................... 285/231 |
| 5,454,604 | A | * | 10/1995 | Yahagi et al. .................. 285/49 |
| 5,746,453 | A | * | 5/1998 | Roberts ......................... 285/47 |
| 5,882,046 | A | * | 3/1999 | Thomas ....................... 285/226 |
| 6,012,745 | A | * | 1/2000 | Fuoss .......................... 285/400 |
| 6,044,904 | A | * | 4/2000 | Shafer ...................... 166/75.13 |
| 6,131,960 | A | * | 10/2000 | McHughs ................... 285/302 |
| 6,481,764 | B1 | * | 11/2002 | Kwok .......................... 285/382 |
| 6,685,238 | B1 | * | 2/2004 | Pouillard ..................... 285/337 |

* cited by examiner

Primary Examiner—James M. Hewitt

(57) ABSTRACT

A compressed seal expansion joint for fluidically connecting in a sealed relationship adjacent ends of two conduits adapted for carrying fluids of varying temperatures, the expansion joint comprising telescopically arranged outer and inner pipe members adapted to be connected to each of the conduits, the outer pipe member defining an annular packing chamber opening through its inner surface for containing at least two cylindrical guide rings disposed at opposite ends of the chamber, the rings being of a generally rectangular cross section having their long faces longitudinal to the members axis and selected of an elastic and semi-plastic packing composition pressurized by tensioned hoop bands circumscribing the outer pipe member and selected to elastically deform the outer pipe member and communicate a circumferentially compressive force to the guide rings so as to create bearing and frictional loadings and seal between guide ring surfaces and the pipe member surfaces during axial and rotational relative pipe member movement.

8 Claims, 2 Drawing Sheets

COMPRESSED SEAL FOR A MOVABLE JOINT

FEDERAL RESEARCH STATEMENT

The development effort for this current invention was funded under US Army Space and Missile Defense SBIR Topic Number BMDO00-013, Contract Number DASG60-01-C-0068.

BACKGROUND OF INVENTION

This invention relates to a pipe joint and coupling for tubular fluid conduits and to dynamic inter-fitted pipe members and seals in telescoping relationship constructed to provide for axial positional movement relative to a member and remain fluid-pressure-tight, and more particularly to such a joint where the external and outer member is elastically deformed by an external hoop tensile member providing elastic spring biasing to compressively pressure and assure circumferential contact between members and seals for maintaining a leak-proof seal and fitting.

Such expansion joints possessing specific bearing structures such as compressed resilient seals accommodate relative motion between and positional adjustment of one or more pipe members to compensate for alignment and linear thermal expansion or contraction for cryogenic fluid flow in polymer matrix composite (PMC) piping systems for rocket fuel and electronic cooling of lasers or focal plane arrays.

Slip-type expansion joints are used to couple the ends of two pipes or conduits containing high pressure steam or cryogenic fluids in a manner accommodating limited axial movement of the two pipes. In a basic slip-type expansion joint, the annular ring space or cut-out recess between two telescoping pipes is utilized as a stuffing box to receive packing rings and packing material that is installed with compression. The semi-plastic packing material exerts hydraulic-like squeezing force on the sliding surface of the two pipe to maintain a seal and often also to maintain alignment during their relative and limited axial movement. Due to their symmetry, these expansion joints also allow limited rotational relative movement. In general, these basic expansion joints lose their seal due to sealing material creep over time, due to loss of initial packing compression load, and due to vibration, movement, and wear.

DESCRIPTION OF PRIOR ART

In the prior art Schaefer in U.S. Pat. No. 5,421,621 discloses a joint with hydraulic plumbing to reestablish the initial packing pressure after operational loss. Schaefer provides adjustability of seal pressure but depends upon a viscous packing fluid capable of being pumped. With its numerous threaded inlets Schaefer is not applicable to polymer matrix composite piping materials. All sealant materials stiffen at cryogenic temperatures. However the hydraulic fluids Schaefer utilizes experience a sufficient change in properties to inhibit joint movement at cryogenic temperatures.

In the prior art Dean et al. in U.S. Pat. No. 6,449,942 teaches a telescoping joint with gimbals for cryogenic fluids for a rocket engine fuel supply pipe and duct. Dean uses a series of circular metal springs in an annulus to maintain contact and primary seal between the surfaces within the sliding joint with elastomeric ride rings as a further seal. Dean may suffer fluid leakage during the introduction of a cryogenic fluid since the inner alloy pipe will shrink inwardly away from the outer pipe, especially at the spring contact points where the springs would also shrink until contact was lost. Dean has metal-to-metal spring to member contact. Joint lock-up would be likely during multiple rocket firing cycles due to frozen condensation attracted during previous cycles. Dean has no packing chamber and no pressure adjustability after installation. Dean's metal springs are not applicable to PMCs. Dean acknowledges the bracing and restrains that practical experience with liquid rocket engine piping systems have dictated for expansion bellows in the prior art. But Dean provides no damping ability to provide restraint to unwanted movement transients due to irregular rocket turbo pump gas/fluid flow leading to combustion surges. Dean cannot provide a selected degree of predetermined design restraint based on friction at rest, experience relative movement, and then recapture substantially all of that design restraint in a new position.

External adjustable clamps to deform a hose, tube, or pipe for permanent gripping assembly of static joints and surfaces are well known in the prior art. Such assembly connections are not suitable for high pressures above 500 psi, cryogenic fluids, or longitudinal movement due to thermal expansion of the members.

SUMMARY OF INVENTION

To overcome these and other problems in the prior art the current invention simply stated focuses upon a telescoping joint possessing an external band and clamp that is tensioned after assembly to compress and radially deflect the outer pipe member. Internal surfaces of sealant and members local to the deflection are compressed together to prevent fluid loss at substantial pressures during relative movement, and to maintain relative position due to frictional restraint until overcome when movement force is applied.

The current invention has an external clamp that is tensioned after assembly to create hoop tension in the clamp material which is configured as a strap or band and selected to induce circumferential compression within the pipe member on which it is mounted. There are a variety of fixed and adjustable clamps that may be utilized in the current invention. A fixed clamp may consist of a filament wound band of high modulus fiber or prepreg that is tensioned and pre-stressed as it is wound. An adjustable clamp may be as simple as a commercial hose clamp that consists of a serrated metal band that is tightened by a screw thread and engaged by a manual or electric power driven tool or connection.

In general, PMC members that must maintain high stress levels for extended periods of months or years experience the detrimental effects of creep that can lead to member failure. For this current invention as in general usage long term creep decreases the ability of the outer pipe member to resist the deflecting force of the clamping band. The internal resistive stress of the outer pipe relaxes, yet its deflected radius is maintained. The seal, the guide rings, and the inner pipe member also elastically deflect and respond to support and prevent ultimate creep deformation and failure in the outer pipe member. This invention teaches that this configuration of elements is self balancing for detrimental creep. The stress produced in a PMC outer pipe member need not be limited below 20% of the ultimate combined stress strength to prevent creep in the outer pipe member as might be common practice. Thus this invention can claim to use 100% of the elastic range of the outer pipe to create deflection and force surface bearing and resistive sealing since the goal is deflection and the initial clamping force determines the deflection in concert with all contact elements, not just the outer member alone.

For the purposes of this current invention, polymer matrix composites (PMC) encompass high-modulus fibers such as carbon, glass, or Kevlar™, etc. encased in either a thermoplastic or thermoset polymer matrix material. Pipes made of these materials are quite strong and stiff for their weight and are commonly thin in terms of the ratio of thickness to diameter for a given pressure. For this reason, PMC pipe members are components of the preferred embodiment since such thin pipes can more easily be deflected elastically.

OBJECTS

A general object of the current invention is to provide a high-pressure seal for cryogenic fluid expansion joints.

Another object of the current invention is to simplify assembly by eliminating imprecise manual compression of packing material.

Another object of the current invention is to utilize the elastic ability of PMCs and thin walled alloy piping to assure seal pressure.

Another general object of the current invention is to provide a post assembly pressurization of the packing material and thus assure surface to surface seal.

Another object of the current invention is to provide adjustable seal pressure.

Another object of the current invention is to provide the basis for automatic changes for seal pressure in response to changing operating conditions.

Another object of the current invention is to provide an expansion joint for PMCs.

Yet another object of the current invention is to constrain the joint for operational loadings by imposed compressive surface frictional loadings due to imposed hoop tension.

Another object of the current invention is to provide an expansion joint for a liquid rocket engine fuel delivery system where cryogenic temperatures create large excursions in long pipe runs.

Another object of the current invention is to provide an expansion joint for composite electronic cooling systems.

Another object of the current invention is to provide a compressed telescoping joint that will absorb overstress, torque shock, and axial impact loads and reestablish a fixed frictional bond and seal after relative movement.

Yet another object of the current invention is to provide a selected degree of predetermined design restraint based on friction at rest, experience relative movement, and then recapture nearly all of that design restrain in a new position of its telescoping members.

It is yet another object of the current invention to provide a degree of restraint in a telescoping expansion joint to resist the axial loading thrust that is the result of internal pressure within a pipe while providing the freedom of movement necessary to allow for the larger axial loading thrust that is the result of thermal contraction and expansion of pipe runs due to intermittent cryogenic fluid flow.

APPARAENT MODIFICATIONS

It will be recognized by one skilled in the art that the slip joint of the current invention may be modified to include any of the following:—means for attaching and restraining seals and guide rings to either member,—guide rings elastically compressed by clamps either singly or in concert with seals,—multiple or single seals compressed by multiple or single external clamps,—variation in clearances between members and seals to meet operating conditions,—annular recesses in members to create packing chambers having precise volumes,—means for limiting the relative excursion either in axial or rotational movement,—surface treatment of members to increase or reduce sliding friction resistance and wear, and—combinations of alloy and PMC members.

It will additionally recognized by one skilled in the art that the method of assembly for the current invention comprises the steps of assembling the seals and guide rings into the pipe members and then tensioning the outer bands to compress the seals.

It will also be recognized by one skilled in the art that the current invention may be combined with rotator joints and gimbels within a rocket engine piping system to enable small steering angle adjustments of the rocket nozzle's direction.

DETAILED DESCRIPTION

Figure 1:
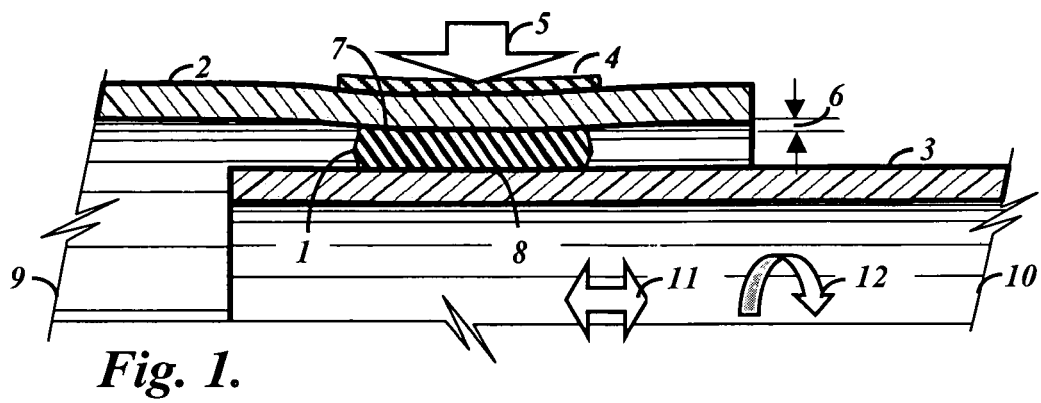
FIG. 1 is a partial section through the center of two concentric telescoping tubes separated by a compressed seal showing the sealing action of the elastic deflection of the outer pipe after the teaching of the current invention.

In FIG. 1 a compressed seal expansion joint is shown comprising at least one generally cylindrical resilient and elastic seal 1 disposed in an annular packing chamber defined between telescopically arranged outer 2 and inner 3 pipe members and an outer circumferentially tensioned band and clamp 4 positioned longitudinally over the generally cylindrical resilient and elastic seal 1 and selected to produce a compressive force 5 to radially deflect the outer pipe member and thereby compress and deflect the generally cylindrical resilient and elastic seal with a deflection shown at 6 so that the outer and inner pipe members and the generally cylindrical resilient and elastic seal create and maintain a bearing and static and dynamic friction-loaded sealed relationship between the generally cylindrical resilient and elastic seal and outer and inner pipe member surfaces 7, 8 for fluid flow at varying temperatures between adjacent ends of two conduits 9, 10 during axial sliding 11 and rotational 12 relative movement of the outer and inner pipe members 2, 3.

Figure 2:
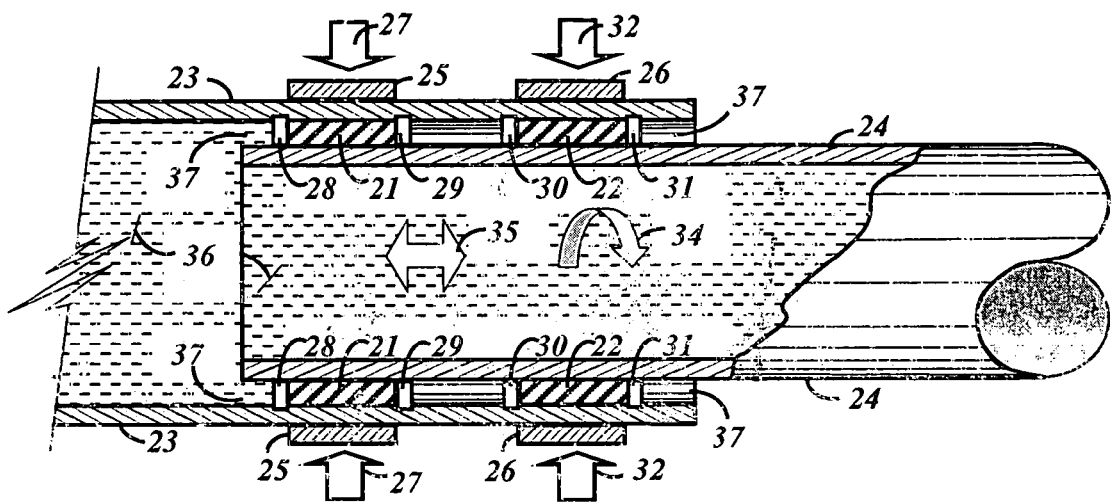
FIG. 2 is a cutaway to a longitudinal cross-section through the center of a compressed seal expansion joint of the preferred embodiment better illustrating the fluid and fluid sealing.

In FIG. 2 the compressed seal expansion joint possesses more than one generally cylindrical resilient and elastic seal 21,22 and outer circumferentially tensioned band and clamp 25,26. In this preferred embodiment the fluid 36 is a cryogenic fluid and a rocket engine fuel reactant. For the purposes of this current invention cryogenic fluids include carbon dioxide, oxygen, nitrogen, hydrogen, and helium and such other gases that require low temperatures to maintain fluid state. Rocket engines commonly utilize liquid hydrogen and liquid oxygen as reactants.

The pipe duct members 23, 24 are composed of polymer matrix composites. The generally cylindrical resilient and elastic seals 21,22 consists of commercial sealing materials such as Graphoil™, polyethylene, polypropylene, Teflon™, or other resilient, plastic, elastic materials resistant to cryogenic temperatures and the chemical effects of the various fluids being transported.

The annular packing chamber 37 is further volume constrained and circumscribed for each generally cylindrical resilient and elastic seal 21,22 by cylindrical guide rings 28,29 and 30,31 attached to a member and extended radially between the outer and inner pipe members and in close proximity to the cylindrical guide rings and selected to provide a fixed initial volume and secure position during relative movement for the generally cylindrical resilient and elastic seals 21,22. In this preferred embodiment the compressive forces 27,32 are further selected to produce static compressive frictional forces on the contact surfaces of the generally cylindrical resilient and elastic seals 21,22, the cylindrical guide rings 28,29 and 30,31 and the outer and inner pipe members 23,24 to resist and prevent relative movement due to axial internal pressure, vibration, and transient operational loads. The outer circumferentially tensioned band and clamps 25,26 are selected to provide means for manual and power driven adjustment of the circumferential hoop compressive forces 27,32.

What is claimed is:

1. A telescoping compressed seal expansion joint comprising:

at least one generally cylindrical resilient and elastic seal disposed in an annular packing chamber defined between telescopically arranged outer and inner pipe members, and an outer circumferentially tensioned band positioned over said generally cylindrical resilient and elastic seal and selected to produce a compressive force to radially deflect elastically said outer pipe member and thereby compress and deflect said generally cylindrical resilient and elastic seal so that said outer and inner pipe members and said generally cylindrical resilient and elastic seal create and maintain a bearing and friction-loaded sealed relationship for and during fluid flow at varying temperatures between adjacent ends of two conduits throughout varying telescopic positions of said outer and inner pipe members.

2. The telescoping compressed seal expansion joint of claim 1 whereby said compressed seal expansion joint possesses more than one generally cylindrical resilient and elastic seal and outer circumferentially tensioned band.

3. The telescoping compressed seal expansion joint of claim 1 whereby said annular packing chamber is further volume constrained and circumscribed for each said generally cylindrical resilient and elastic seal by at least two cylindrical guide rings attached to one of said outer and inner pipe members and extended radially between said outer and inner pipe members and selected to provide a fixed initial volume for each said generally cylindrical resilient and elastic seal.

4. The telescoping compressed seal expansion joint of claim 3 whereby said compressive force is further selected to produce static compressive frictional forces on the contact surfaces of each said generally cylindrical resilient and elastic seal, said cylindrical guide rings, and said outer and inner pipe members to resist and prevent relative movement due to axial internal pressure, vibration, and transient operational loads.

5. The telescoping compressed seal expansion joint of claim 1 whereby said outer and inner pipe members are composed of polymer matrix composites.

6. The telescoping compressed seal expansion joint of claim 1 whereby said fluid is a cryogenic fluid.

7. The telescoping compressed seal expansion joint of claim 1 whereby said fluid is a rocket engine fuel reactant.

8. The telescoping compressed seal expansion joint of claim 1 whereby said outer circumferentially tensioned band is selected to provide means for manual and power driven adjustment.

* * * * *